US007292214B2

(12) United States Patent
Bolotski et al.

(10) Patent No.: US 7,292,214 B2
(45) Date of Patent: Nov. 6, 2007

(54) METHOD AND APPARATUS FOR ENHANCED PERFORMANCE LIQUID CRYSTAL DISPLAYS

(75) Inventors: Michael Bolotski, Berkeley, CA (US); David Huffman, Pinole, CA (US)

(73) Assignee: Microdisplay Corporation, Fremont, CA (US)

( * ) Notice: Subject to any disclaimer, the term of this patent is extended or adjusted under 35 U.S.C. 154(b) by 0 days.

(21) Appl. No.: 09/480,986

(22) Filed: Jan. 10, 2000

(65) Prior Publication Data

US 2003/0043093 A1 Mar. 6, 2003

Related U.S. Application Data

(60) Provisional application No. 60/115,482, filed on Jan. 11, 1999.

(51) Int. Cl.
*G09G 3/36* (2006.01)
*G09G 5/00* (2006.01)
*G06F 3/038* (2006.01)

(52) U.S. Cl. ........................................ 345/95; 345/208

(58) Field of Classification Search .................. 345/88, 345/89, 94–97, 208; 349/86, 87, 33, 96
See application file for complete search history.

(56) References Cited

U.S. PATENT DOCUMENTS 5,172,108 A * 12/1992 Wakabayashi et al. ...... 340/793
5,196,834 A * 3/1993 Edelson et al. ............. 340/703
5,627,557 A * 5/1997 Yamaguchi et al. .......... 345/90
5,627,560 A * 5/1997 Verhulst ...................... 345/97
6,075,506 A * 6/2000 Bonnett et al. ............... 345/89
6,144,353 A * 11/2000 McKnight .................... 345/94

* cited by examiner

*Primary Examiner*—Jeff Piziali
(74) *Attorney, Agent, or Firm*—Townsend and Townsend and Crew LLP

(57) ABSTRACT

A method for operating a display having a plurality of pixel elements includes applying a transition voltage to the plurality of pixel elements, applying a first paint voltage to one pixel element of the plurality pixel elements, waiting a predetermined time period, illuminating the one pixel element, applying the transition voltage to the plurality of pixel elements, applying a second paint voltage to the one pixel element elements, waiting the predetermined time period, and illuminating the one pixel element. The transition voltage is different from the first paint voltage applied to the one pixel element.

12 Claims, 6 Drawing Sheets

METHOD AND APPARATUS FOR ENHANCED PERFORMANCE LIQUID CRYSTAL DISPLAYS

CROSS-REFERENCE TO RELATED APPLICATIONS

This present application claims priority to U.S. Ser. No. 60/115,482 filed Jan. 11, 1999, commonly assigned, and hereby incorporated by reference for all purposes.

BACKGROUND OF THE INVENTION

The present invention relates to electrically addressable optically active matrix arrays, such as liquid crystal displays (LCDs) or spatial light modulators. More particularly, the invention relates to methods and apparatus for enhancing performance of such active matrix arrays.

Liquid crystal materials and other electro-optical materials often have asymmetric transition times, for example, the transition from a bright to a dark state can be different from the transition from the dark state to the bright state. In some examples, the transition time from state A to state B may be up to four times faster than the transition time from the state B to state A. In one mode of operation A may be bright and B may be dark, and in another mode B may be bright and A may be dark. It is generally the case that the transition time for one direction (A to B) can be accelerated by applying higher drive voltages, however the other transition direction (B to A) is limited by the physical and mechanical properties of the liquid crystal molecules. As such, the other transition direction cannot be accelerated by electronic means.

Faster frame update rates are highly desirable for display systems. For example, faster update rates decrease flicker (improving image quality) and relieve eyestrain. In field-sequential color systems, slow update rates lead to the objectionable "color breakup" effect, where successive red, green, and blue images are drawn too slowly for the human visual system to temporally fuse the images.

In a typical liquid crystal display (LCD), a series of pixels, each including liquid crystal material, are driven with drive voltages, in order to change the state of the material. More specifically, in a typical display addressing scheme, voltages are driven onto the pixel electrodes in a sequential scanning method to force transitions to a particular state, e.g. bright or dark. Often, several voltages are provided to the display at once to reduce addressing These pixel driving voltages may be continuous (analog), as used by companies such as Colorado Microdisplay, Inc., or binary (digital), as used by companies such as DisplayTech, Inc. There are also hybrid approaches where a digital pixel value is used as a selector to multiplex global analog voltages onto pixel electrodes.

A drawback to prior addressing methods is that they limited the performance of the LCD. One common factor in prior addressing methods is that the overall display update interval was determined by the sum of the matrix addressing time and the worst-case electro-optical material transition time. Generally, the longer the addressing and transition times, the slower the performance of the pixels and the LCD.

Attempting to increase the performance of an LCD despite the fixed addressing and transition times decreased image fidelity and lead to a phenomenon termed temporal crosstalk. Typically, the worst-case electro-optical material time must be used to determine performance of the LCD because the data displayed on the LCD may not valid until the very last pixel element that was addressed has transitioned to its final state, e.g. to A or to B. If the display were allowed to be viewed before the last state transition has been completed, the viewer would perceive an blend of the new pixel state or brightness and the previous frame's or field's pixel state or brightness.

One possible approach to reduce temporal crosstalk is blank the display while addressing the pixels. This approach necessitates a trade-off between brightness and contrast. If the display is blanked to a dark state, the average perceived brightness would decrease. If the display is blanked to a bright state, black pixels would appear bright for some of the frame time, increasing the perceived brightness of, and thereby decreasing contrast.

Temporal crosstalk also has undesirable effects in the field-sequential color mode of operation. Field sequential systems produce color images using a grayscale display and color illuminators (typically red, green, and blue). In this mode, a grayscale image corresponding to the red component of an image is drawn on the display and then the display is illuminated with a red light, from a light-emitting diode (LED) or with a bright lightbulb and a color filter. The process is repeated again for the blue and green image components. If the refresh frequency is sufficiently high, the eye will perceive uniform color.

The sequence of a particular field is therefore: (1) update the pixel voltages; (2) wait for the liquid crystal to transition; and (3) illuminate the device. If step (2) is too short and the LC material does not complete the transition, the current color component will be a blend of the previous color and the current color. For example, a bright green image has a dark red field followed by a bright green field followed by a dark blue field. Temporal crosstalk would result in a too-dark green followed by a too-bright blue. Therefore, color purity would be adversely affected.

In light of the above, what is needed are improved methods and apparatus for increasing performance of an LCD.

SUMMARY OF THE INVENTION

The present invention relates to liquid crystal displays. In particular, the present invention relates to methods and apparatus for enhancing performance in liquid crystal displays. The invention includes a set of techniques, methods, circuit architectures, and system designs to reduce the transition interval between the time that the last pixel element has been addressed and the time that a valid image can be viewed.

Another object of the present invention is to provide a method for electrically driving the pixel electrodes to a common value in a time interval substantially faster than the time required to address the entire display. This may be accomplished by overlapping the optical transition time with the matrix addressing time.

One advantage of embodiments of the present invention is that optically active materials with asymmetric transition times can be used with a waiting interval that is less than the worst-case transition interval. Another advantage of the of the embodiments is that the additional circuitry provided for the transition initiation can also be used for electronic test of the display integrity.

According to one embodiment, a method for operating a display having a plurality of pixel elements includes applying a transition voltage to the plurality of pixel elements, applying a first paint voltage to one pixel element of the plurality pixel elements, waiting a predetermined time period, and thereafter illuminating the one pixel element. The method also includes re-applying the transition voltage to the plurality of pixel elements, applying a second paint voltage to the one pixel element elements, waiting the predetermined time period; and thereafter illuminating the one pixel element. The transition voltage is different from the first paint voltage applied to the one pixel element.

According to another embodiment, a display having a plurality of pixel elements is described that includes a transaction circuit coupled to each pixel element in the plurality of pixel elements, the flash clear circuit configured to apply a transition voltage to the plurality of pixel elements, and a paint circuit coupled to the transaction circuit, the paint circuit configured to apply a first paint voltage and a second paint voltage to one pixel element from the plurality of pixel elements after the transition voltage is applied to the plurality of pixel elements. Also included are a timer circuit coupled to the paint circuit, the timer circuit configured to determine when a predetermined time period has elapsed, and an illumination circuit coupled to the timer circuit, the illumination circuit configured to illuminate the one pixel element after the predetermined time period has elapsed. The transition voltage is applied to the plurality of pixel elements before the first paint voltage is applied to the plurality of pixel elements, and the transition voltage is applied to the plurality of pixel elements before the second paint voltage is applied to the plurality of pixel elements.

According to yet another embodiment, a circuit for driving a liquid crystal display having a plurality of pixels includes an initializing circuit coupled to the plurality of pixels configured to apply an initial voltage to the plurality of pixels, and a driving circuit coupled to the initializing circuit configured to apply a first drive voltage and a second drive voltage to a pixel from the plurality of pixels after the initial voltage has been applied to the plurality of pixels. An illumination circuit is also included coupled to the driving circuit configured to illuminate the pixel a predetermined time period after the pixel has been driven with first drive voltage and after the pixel has been driven with the second drive voltage. The initial voltage is applied to the plurality of pixels before the pixel is driven with the first drive voltage, and the initial voltage is applied to the plurality of pixels before the second drive voltage is applied to the plurality of pixels.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

The present invention relates to liquid crystal displays. In particular, the present invention relates to methods and apparatus for enhancing performance in liquid crystal displays.

Figure 1A:
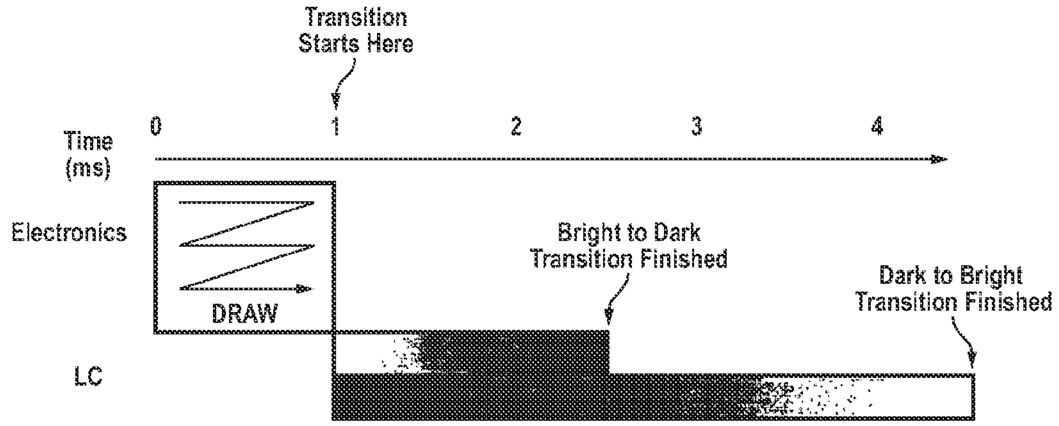
FIGS. 1*a* and 1*b* illustrates a graphic representation of a conventional system.
Figure 1B:
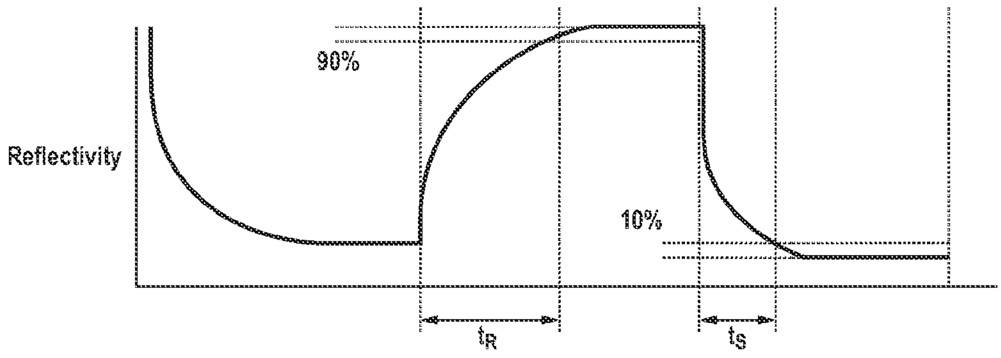

FIGS. 1*a* and 1*b* illustrates a graphic representation of a conventional system. As illustrated the pixels on an LCD, or other type os display, are illustrated driven with data signals in the first millisecond. Other terms for driven include drawn, painted, and the like. Typically, the pixels are driven from right to left within a row of pixels, and from top row to bottom row. Thus, the top left pixel is drawn first near the 0 millisecond mark, and the bottom right pixel is drawn last right before the 1 millisecond mark.

FIG. 1*b* illustrates typical physical characteristics of an LCD pixel. FIG. 1*b* illustrates the change in reflectivity of the pixel with respect to time. In this embodiment, when a drive voltage is applied so that the pixel becomes more reflective, brighter, the pixel takes at least a time 100 to brighten up. In this case, time 100 represents the amount of time for the pixel to change from 10% reflectivity to 90% reflectivity. In typical embodiments, time 100 is on the order of 3.5 milliseconds Further, in this embodiment, when a drive voltage is applied so that the pixel becomes more less reflective, darker the pixel takes at least a time 110 to darken. In this case, time 110 represents the amount of time for the pixel to change from 90% reflectivity to 10% reflectivity. In typical embodiments, time 110 is on the order of 1.5 milliseconds. As illustrated in FIG. 1*b*, time 100 and 110 are asymmetric.

In the embodiment in FIG. 1*a*, if the bottom right pixel is painted to be a dark pixel, the amount of time for the pixel to switch to dark is thus on the order of time 100, or in this example 1.5 milliseconds. Further, if the bottom right pixel is painted to be a bright pixel, the amount of time for the pixel to switch to bright is thus on the order of time 110, or in this example 3.5 milliseconds.

As illustrated in FIG. 1*a*, the worse case situation is where the last pixel is to be switched to bright. Because, it is not known a prior whether the last pixel is to be bright or dark, the worse case situation is assumed. Accordingly, only after approximately 4.5 milliseconds (1 milliseconds painting+3.5 milliseconds waiting) is the correct data displayed on the entire LCD. After the data is correct, the entire LCD is illuminated.

Figure 2:
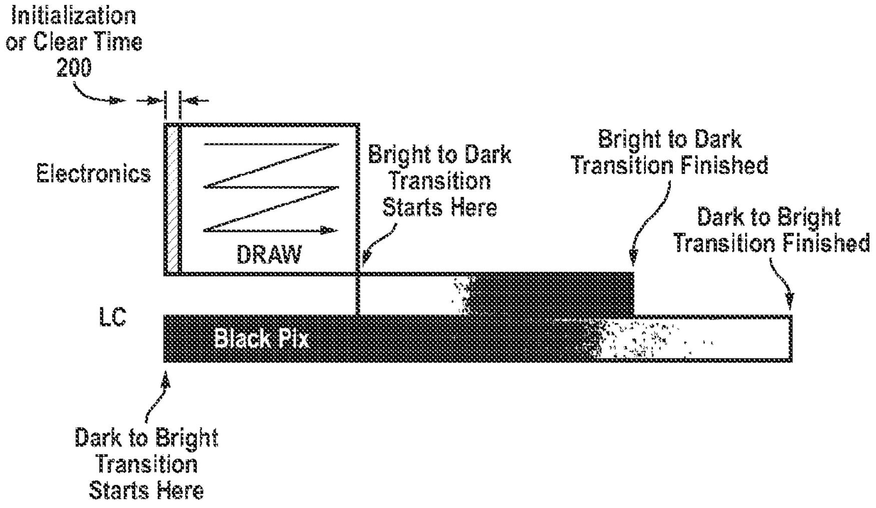
FIG. 2 illustrates a timing diagram according to an embodiment of the present invention.

FIG. 2 illustrates a timing diagram according to an embodiment of the present invention. In this example, all of the pixels of the LCD are drawn within 1 millisecond, as was described above. Further, the transition times from bright to dark and from dark to bright are also similar as described above.

The present embodiment includes an initialization or clear time 200, that is on the order of approximately 0.1 milliseconds. During this clear time 200, a transition optimized voltage is supplied to each of the pixels in the LCD to "initialize" the pixels. The transition enhanced voltage is supplied to each pixel until the pixel is driven with the "regular" data, during the 1 millisecond painting or drawing time.

For example, in the diagram in FIG. 2, during the clear time 200, a transition enhanced voltage associated with bright is supplied to all the pixels in the LCD, such as 5 volts. During the next 1 millisecond, driving voltages are supplied to all the pixels in the LCD. These driving voltages overwrite the transition enhanced voltage and may force the pixel to be dark, by applying 0 volts, or may force the pixel to be bright by applying 5 volts.

The transition enhanced voltage may be the worse case driving voltage. For example, as described above, since the dark to bright transition is the slower of the two transitions, the transition voltage should be the voltage that drives the pixel to be bright. In alternative embodiments of the present invention, the transition enhanced voltage may be anywhere between the dark driving voltage and the bright driving voltage.

Thus in the example in FIG. 2, after clear time 200, a voltage associated with a bright pixel is applied to the last pixel on the LCD. If the last pixel should actual be dark, a voltage associated with the dark pixel is applied during the drawing time. Because the bright to dark transition time is faster than the dark to bright transition time, the last pixel will change to dark within, in this example 1.5 milliseconds. If the last pixel should be light, a voltage associated with the light pixel is applied during the drawing time. Because the voltage associated with the light pixel was applied immediately after clear time 200, the pixel will be light approximately 3.5 milliseconds after clear time 200. Since the dark to light transition time overlaps with the drawing time, there is less waiting time until the data is fully written onto the LCD.

As shown in FIG. 2, the LCD valid data is written and ready to be displayed approximately 3.6 milliseconds after the field time begins. As was illustrated in FIG. 1A, typically the LCD was ready approximately 4.5 milliseconds after the field time begins. As a result, the present embodiment provides a shorter field time, which translates into higher performance LCDs.

In embodiments of the present invention, the bright to dark or dark to bright transition times may be different from the example above. For example, the bright to dark transition time may be on the order of 1.2 milliseconds, whereas the dark to bright transition time may be on the order of 5 milliseconds.

Figure 3:
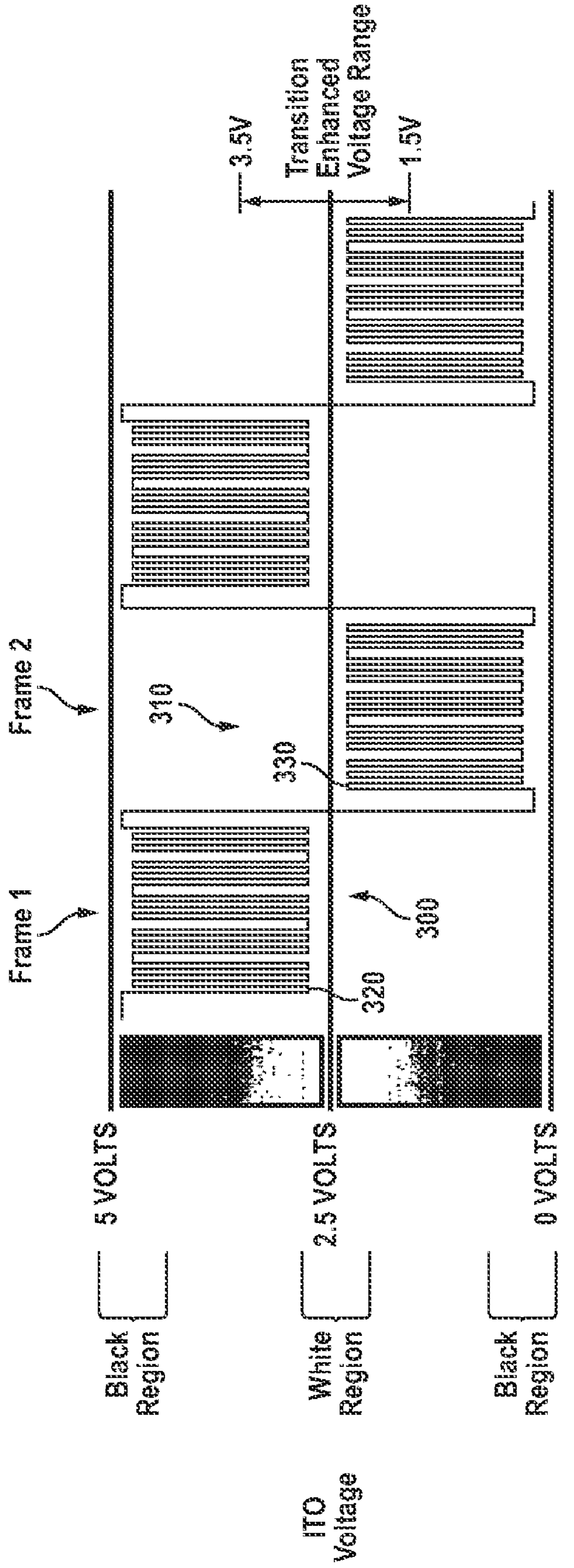
FIG. 3 illustrates another embodiment of the present invention.

FIG. 3 illustrates another embodiment of the present invention. In this embodiment, the pixel typically includes a common top plate electrode and a bottom electrode coupled to a driving transistor. The top plate electrode is typically manufactured with a conductive indium tin oxide (ITO) layer.

In the present embodiment, the voltage (VITO) applied to the ITO layer is approximately set to the midpoint of a supply voltage Vdd. In this embodiment, Vdd is approximately 5 volts, thus VITO is approximately 2.5 volts, as is shown. In this embodiment, the voltages applied during field 300 range from 3.2 volts to 5 volts, and the voltages applied during field 310 range from 0 volts to 1.8 volts. However, in alternative embodiments, other ranges of voltages may also be used.

In order to induce the correct voltage polarities across a pixel, to create bright or dark pixels across field times, the applied voltages are displayed with opposite polarity during the successive fields. For example, in this embodiment, during field 300, in order to cause a pixel to be bright, the voltage applied 320 is nearer to 2.5 volts than to 5 volts, for example 3.3 volts. Further, during field 310, in order to cause a pixel to be bright, the voltage applied 330 is nearer to 2.5 volts than to 0 volts, for example 1.8 volts. Field 300 may be termed active LOW whereas field 310 may be termed active HIGH, or the like.

In the present embodiment, the transition enhanced voltage ranges from 1.5 volts to 3.5 volts. More particularly, the transition enhanced voltage applied to the pixels in the LCD after clear time 200 ranges from 2 volts to 3 volts. In some embodiments, the voltage may be approximately 2.5 volts, or may be approximately equal to VITO. In this embodiment, no matter which field 300 or 310 (positive polarity or negative polarity), the transition enhanced voltage is the same for sake of convenience.

In alternative embodiments, the transition enhanced voltage may be different for different polarity fields. For example, if the light to dark transition was slower than the dark to light transition, for field 300, the transition enhanced voltage may be, for example approximately 5 volts, and for field 310, the transition enhanced voltage may be, for example approximately 0 volts, and the like.

Figure 4:
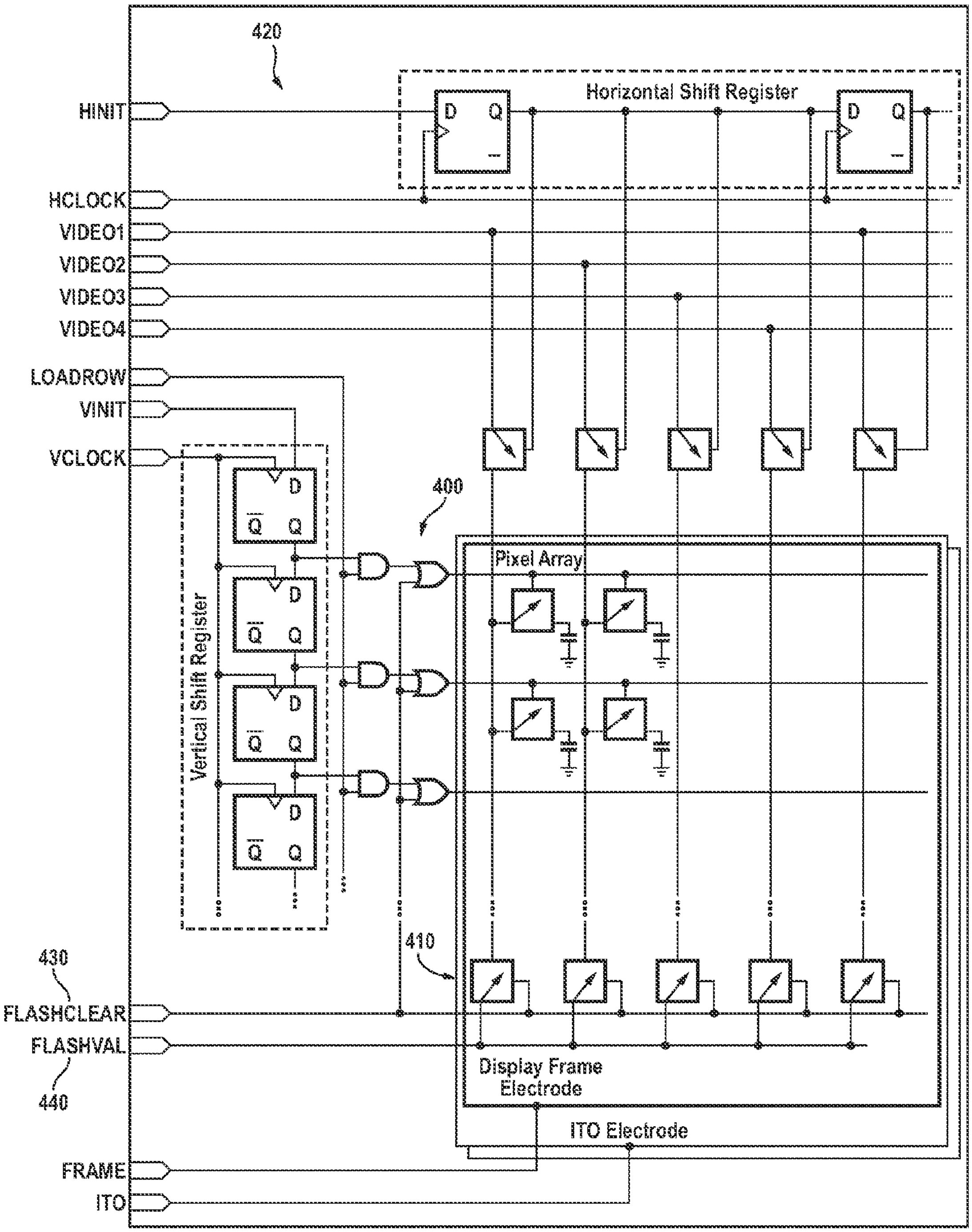
FIG. 4 illustrates an embodiment of the present invention.

FIG. 4 illustrates an embodiment of the present invention. In FIG. 4, a "global row enable" circuit 400 and a switch circuit 410 are added to a conventional analog display architecture.

In the present embodiment, enable circuit 400 is disposed between the vertical scanning register and the row enable wires of the pixel array. Enable circuit 400 is configured to enable all rows of the pixel array, independent of the actual state of the scanning register. In one embodiment, enable circuit can be as simple as a series of logical OR gates. In operation this mode of operation is enabled by a control signal labeled FlashClear 430.

In other embodiments of the present invention, alternative circuit designs for enable circuit 400 may be used according to specific embodiment.

Switch circuit 410 is embodied as a set of switches, one per pixel column, in the pixel array. In operation, these switches couple all columns of the array to a common electrode (labeled FlashVal 440) when FlashClear 430 signal is asserted. FlashVal 400 is the transition enhanced voltage described above.

In other embodiments of the present invention, alternative circuit designs for enable circuit 400 may be used according to specific embodiment. Further, switch circuit 410 may be embodied in the same manner as other switches present on the pixel array. In other embodiments, other designs are envisioned.

Figure 5:
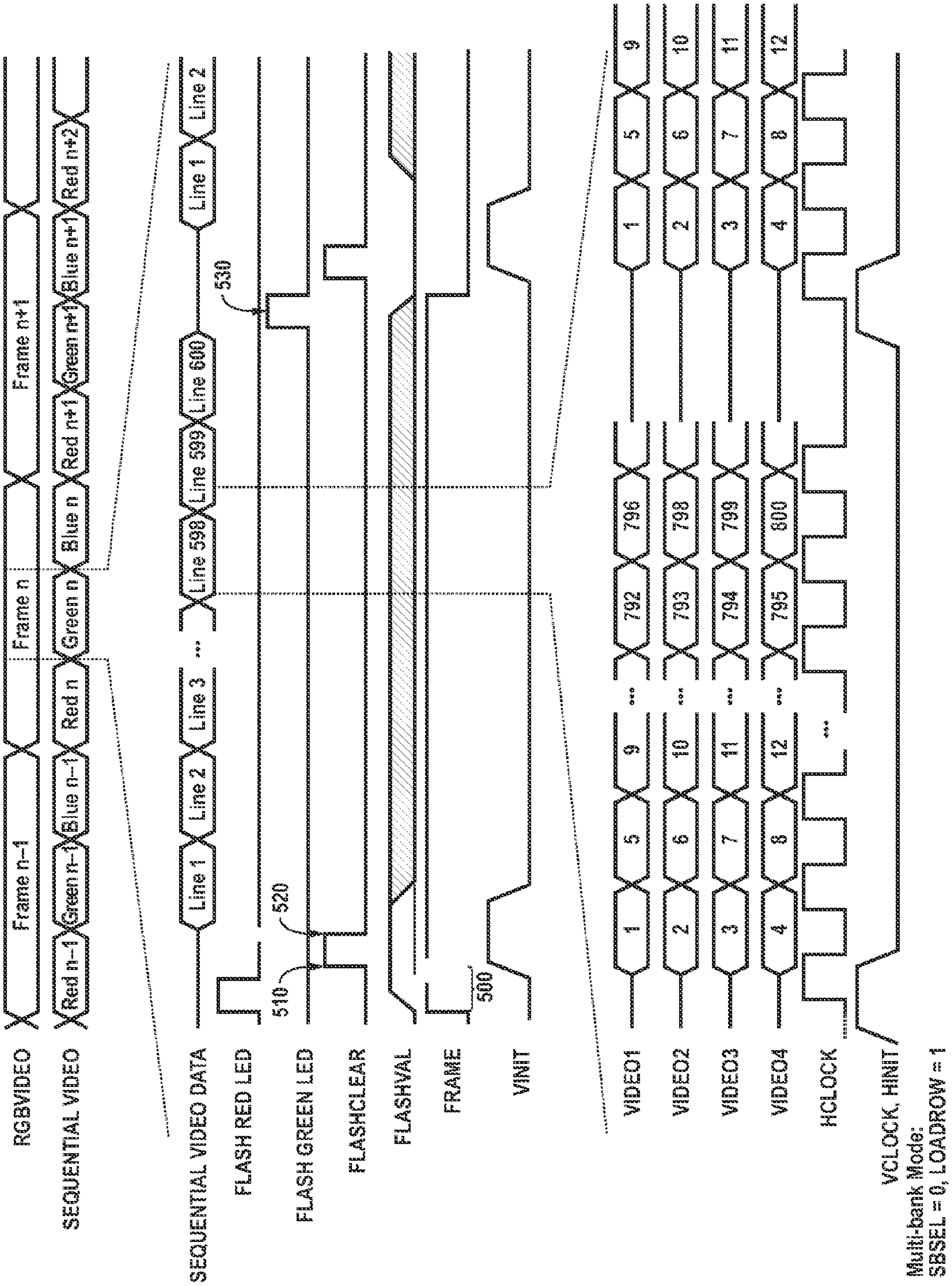
FIG. 5 illustrates a timing diagram according to an embodiment of the present invention.

FIG. 5 illustrates a timing diagram according to an embodiment of the present invention. As shown in this embodiment, at the start of each field, before the first line of video data is provided to the display, the appropriate transition enhanced voltage or transition bias voltage (VTB) is applied to the FlashVal input during time period 500. Then, the FlashClear signal is asserted during time period 510. This signal enables the switching circuit 410 in FIG. 4, thereby setting all columns to VTB. The signal also enables enabling circuit 400 which in turn connects all pixels to the their columns and therefore setting all pixel electrodes to VTB.

After all pixels have been set to VTB, approximately at 520, the liquid crystal material begins the "slow" transition. The FlashClear signal is then unasserted, thus disconnecting the switch circuit 410 and allowing the vertical scanning register to control the row enable switches. The pixels in the array are then driven with the appropriate data voltages on a line by line basis, as shown. After all data has been written, the pixel array is illuminated, 530.

The embodiment in FIG. 5 illustrates a field sequential pixel array. In this embodiment, the array is sequentially written and illuminated with different illumination data and colors to produce a full color image. Thus as illustrated in FIG. 5, the process repeats using blue driving data followed by blue colored illumination, and the like. It should be understood the embodiment may also applied to monochromatic displays.

Enable circuit 400 and switch circuit 410 can be used for other purposes than with the method described above, for example testing. In a first example, the circuitry can be used to test for column defects created during the fabrication of the VLSI substrate. In this scheme, the FlashVal wire is monitored by a voltage sensor (rather than being driven, as in the normal operation). Then, one column at a time is driven from the video input wire. If the voltage sensor reports the same voltage value then the column must be intact. Otherwise, a mismatch may indicate a defective column.

A second testing example occurs during the optical test of an assembled LCOS display. Since the entire image can be easily set by FlashVal to any desired voltage, intensity variations across the display at different FlashVals may be traced to physical device non-uniformity rather than temporal fading effects, or the like.

Figure 6:
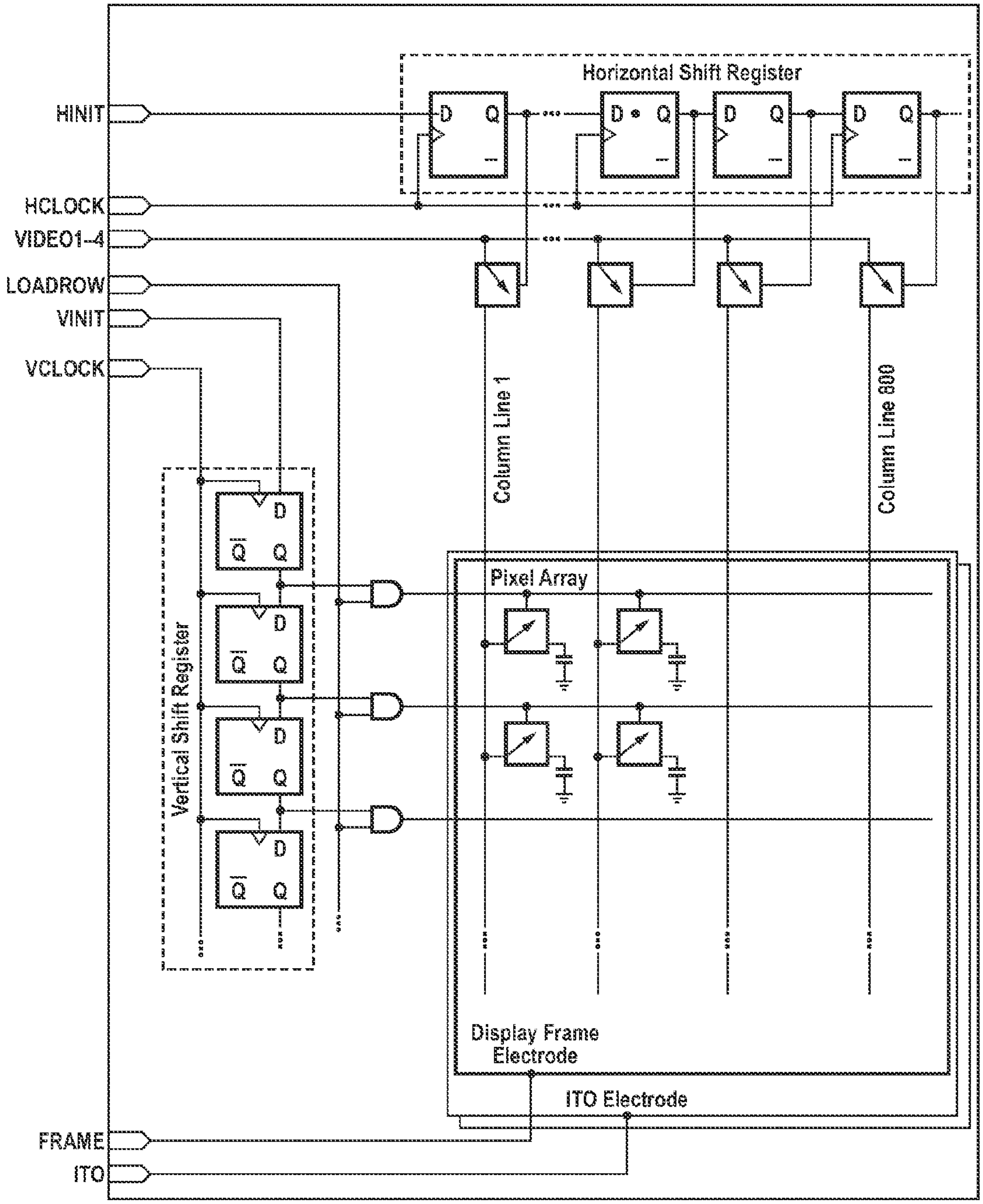
FIG. 6 illustrates another embodiment of the present invention.

FIG. 6 illustrates another embodiment of the present invention. This embodiment includes a conventional active matrix array, however with the feature that the entire horizontal and vertical scanning registers can be configured to enable all column and row switches respectively.

Figure 7:
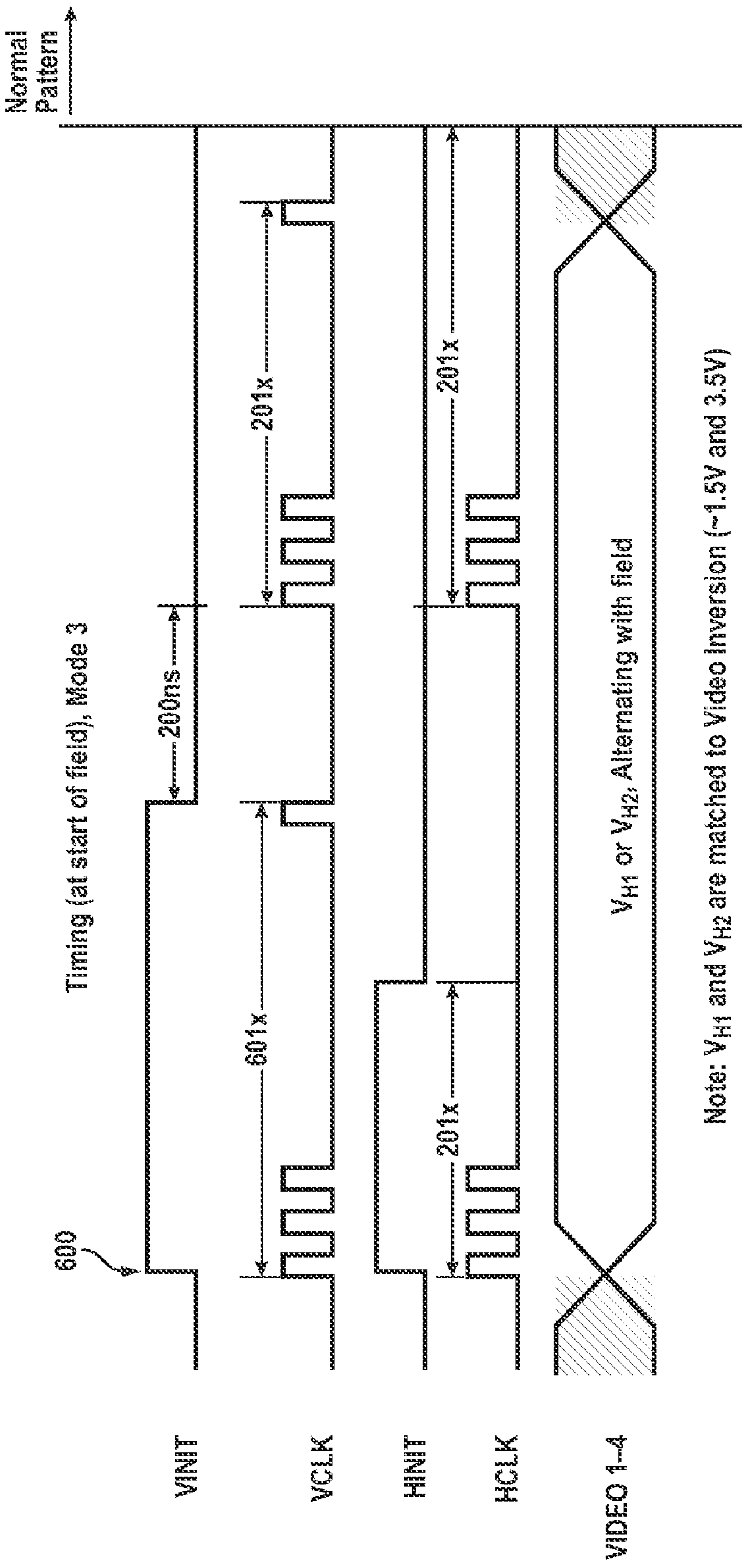
FIG. 7 illustrates a timing diagram according to another embodiment of the present invention.

FIG. 7 illustrates a timing diagram according to another embodiment of the present invention. This method applies a transition enhancement voltage, (transition bias voltage, or the like) to the pixels on the display, however at a slower rate than that illustrated in FIGS. 4 and 5. In particular, the present invention asserts all row enable and column enable signals by the slower process of filling the vertical and horizontal scan registers with enable signals.

As illustrated, at the start of the field 600, the VINIT signal is asserted and VCLK is clocked once for each row (600 rows or lines in this case). VINIT is then unasserted. This operation loads a logical "one" into each element of the scanning register. The same operation is initiated at the same time for the horizontal scan register, with HINIT and HCLK respectively. In this example, HCLK is clocked once for each column (200 times in this example).

In this embodiment, the appropriate VTB voltage is driven onto the video channel signals (VIDEO 1-4) at the start of the operation. In an alternative embodiment, VTB may be driven at the completion of the register loading, however, asserting VTB at the beginning has the effect of reducing peak current through the video wires.

The result of the above invention is a new generation of higher performance liquid crystal displays. Many applications and modifications to this technology are envisioned. For example, global set and reset circuitry could be added to the vertical scanning registers instead of the "global row enable" circuit described above. Similarly, a global reset signal can be added to the horizontal scanning register to eliminate the scanning-out phase of the LineClear mode of operation. A global column switch signal can also be used to disconnect the columns from the video lines instead of manipulating the horizontal shift registers.

One idea common to all of the above embodiments is that there should be some mechanism to quickly write particular voltages to all pixels on the display. Further, a common idea to the LineClear mode of operation is the use of the video data channel to provide the transition bias voltage. The LineClear is somewhat of a misnaming, as it can be modified to address the entire array at once and equal the speed of the ArrayClear circuit.

In other embodiments, the switching circuit may be positioned at the "top" of the column switches. Further, if there are other means for testing the pixel array, and if the video signal inputs can be easily driven to the transition bias voltages, this mode requires less circuitry and will therefore have better yield.

In embodiments of the present invention, the voltage applied to the pixel electrodes is not necessarily the full-brightness voltage. In most cases an intermediate voltage results in an acceptable image. This occurs because as the last pixel is written, if it is already driven too bright, it may take longer to switch back to the dark state. In some embodiments, the clearing circuitry should allow a range of analog values to be placed on the pixel electrodes as the transition bias voltage (VTB).

In situation where the frame rate is sufficiently high, the above techniques method still be applied. For example, the present embodiments allow more time for pixels to complete transitions, thereby improving color accuracy.

Further details regarding characteristics of one embodiment of the present invention is found in MD800G6 Preliminary Specifications in the attached appendix. This Specification is incorporated by reference for all purposes.

Embodiments of these circuits can be comprised of either discrete components as part of the display drive electronics, or in the other extreme can be completely integrated within the display substrate, or they can be comprised of any combination level of integration. A flat panel display may incorporate the LCD display and any of the above control circuitry.

The foregoing description of preferred embodiments of the present invention has been provided for the purposes of illustration and description. It is not intended to be exhaustive or to limit the invention to the precise forms disclosed. Obviously, many modifications and variations will be apparent to the practitioners skilled in this art.

The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A method for operating a display having a plurality of pixel elements, each of the plurality of pixel elements having a pixel electrode and a common electrode, the method comprising:

a) applying a single transition voltage to the pixel electrode and a pre-determined voltage to the common electrode of a pixel element during a first period of time within a first field time, wherein the single transition voltage modifies a voltage between the pixel electrode and ground and induces liquid crystal material in the pixel element to begin a transition from a dark state to a bright state; thereafter b) while the liquid crystal material for the pixel element is performing the transition to the bright state in response to the application of the single transition voltage, initiating application of a first paint voltage to the pixel electrode during a second period of time within the first field time, wherein the single transition voltage is supplied to the pixel electrode prior to initiating application of the first paint voltage, and wherein initiating application of the first paint voltage, after the pixel element is performing the transition to the bright state, overwrites the single transition voltage and induces liquid crystal material in the pixel element to begin transitioning to a state associated with the first paint voltage; thereafter c) waiting a predetermined time period within the first field time; and thereafter d) illuminating the pixel element within the first field time.

2. The method of claim 1 wherein d) comprises illuminating the pixel element with an illumination source of a first color within the first field time.

3. The method of claim 1 wherein d) comprises illuminating the pixel element with an illumination source.

4. The method of claim 1 wherein the pre-determined voltage applied to the common electrode comprises a constant value.

5. A display having a plurality of pixel elements, each of the plurality of pixel elements having a pixel electrode and a common electrode, the display comprising:

a transaction circuit coupled to each pixel element in the plurality of pixel elements, the transaction circuit configured to apply a first transition voltage to the pixel electrode and a pre-determined voltage to the common electrode of a pixel element during a first time period within a first field time, wherein the pixel element includes a liquid crystal material having at least a first state and a second state, wherein a transition of the liquid crystal material is associated with a slow transition from the first state to the second state, wherein a transition of the liquid crystal material is associated with a fast transition from the second state to the first state, and wherein the first transition voltage modifies a voltage between the pixel electrode and ground and induces liquid crystal material in the pixel element to begin the slow transition to the second state within the first field time;

a paint circuit coupled to the transaction circuit, the paint circuit configured to overwrite the first transition voltage and initiate application, while the liquid crystal material for the pixel element is performing the slow transition to the second state in response to the application of the first transition voltage, of a first paint voltage during a second time period within the first field time to the pixel electrode, wherein the application of the first paint voltage is not initiated until after the application of the first transition voltage and wherein the application of the first paint voltage induces liquid crystal material in the pixel element to begin transitioning to a third state;

a timer circuit coupled to the paint circuit, the timer circuit configured to determine when a predetermined time period has elapsed; and an illumination circuit coupled to the timer circuit, the illumination circuit configured to illuminate the pixel element after the predetermined time period has elapsed within the first field time.

6. The display of claim 5 wherein the illumination circuit is configured to illuminate the pixel element with a first color within the first field time after the first paint voltage is applied to the pixel electrode.

7. The display of claim 6 wherein the first color is selected from the group consisting of red color, green color, blue color.

8. The display of claim 5 wherein the illumination circuit comprises a monochromatic illumination source.

9. The display of claim 5 wherein the pre-determined voltage applied to the common electrode comprises a constant value.

10. A circuit for driving a liquid crystal display having a plurality of pixels, each of the plurality of pixels having a pixel electrode and a common electrode, the circuit comprising:

an initializing circuit coupled to a pixel of the plurality of pixels and configured to apply a first voltage to a pixel electrode of the pixel and a predetermined voltage to the common electrode of the pixel during a first time period of a first field, wherein the first voltage modifies a potential difference between the pixel electrode and ground and induces liquid crystal material in the pixel to begin transitioning to a bright state;

a driving circuit coupled to the initializing circuit and configured to write display data to the pixel electrode, wherein while the liquid crystal material in the pixel is transitioning to the bright state, a drive voltage comprising display data for the pixel is first supplied to the pixel electrode to write display data for the pixel and overwrite the first voltage; and an illumination circuit coupled to the driving circuit configured to illuminate the pixel for a predetermined time period within the first field after the pixel electrode has been driven with the drive voltage.

11. The circuit of claim 10 wherein the illumination circuit is configured to illuminate the pixel with a first color within the first field after the drive voltage has been applied to the pixel electrode.

12. The circuit of claim 11 wherein the first color is selected from the group consisting of red color, green color, blue color.

* * * * *